United States Patent
Ward et al.

(10) Patent No.: US 7,415,507 B1
(45) Date of Patent: Aug. 19, 2008

(54) LOGICAL ROUTERS

(75) Inventors: David Delano Ward, Somerset, WI (US); George Suwala, San Jose, CA (US); Natarajan Shankar, Fremont, CA (US); John Galen Scudder, Ann Arbor, MI (US); Andrew Lunstad, Shoreview, MN (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 10/772,827

(22) Filed: Feb. 5, 2004

(51) Int. Cl.
 *G06F 15/173* (2006.01)
(52) U.S. Cl. ..................................... 709/217
(58) Field of Classification Search ................ 709/220, 709/238
 See application file for complete search history.

(56) References Cited

U.S. PATENT DOCUMENTS

| | | | | |
|---|---|---|---|---|
| 6,594,704 B1 * | 7/2003 | Birenback et al. | ........... | 709/238 |
| 6,760,777 B1 * | 7/2004 | Agarwal et al. | ............. | 709/238 |
| 6,920,134 B2 * | 7/2005 | Hameleers et al. | .......... | 370/389 |
| 7,107,356 B2 * | 9/2006 | Baxter et al. | ................. | 709/245 |
| 7,155,535 B2 * | 12/2006 | Agarwal et al. | ............. | 709/238 |
| 7,200,144 B2 * | 4/2007 | Terrell et al. | ................. | 370/389 |

* cited by examiner

*Primary Examiner*—David Y Eng
(74) *Attorney, Agent, or Firm*—Schwegman, Lundberg & Woessner, P.A.

(57) ABSTRACT

Systems and methods include providing a router that may be deployed as multiple logical routers that share a common fast interconnect. These logical routers may functionally serve as core routers, peering routers, aggregation routers, etc. A further aspect of the system and methods is that the resources assigned to a logical router are allocated from a pool potentially including multitude of hardware cards. A further aspect of the system and methods is that a logical router may be independently managed by the owner of the router or by an owner of the logical router.

30 Claims, 7 Drawing Sheets

LOGICAL ROUTERS

FIELD

The present invention relates generally to network router systems, and more particularly to partitioning such routers into one or more virtual routers.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Cisco Systems, Inc. All Rights Reserved.

BACKGROUND

The use of networks in general and the Internet in particular continues to grow, and with each passing day more and more nodes are being added to networks. The growth of networks causes a commensurate need for additional network infrastructure, including the need for more and bigger routers.

The need for more capable network infrastructure may be acutely felt by "point of presence" providers. A point of presence (POP) is typically considered a physical location, either part of the facilities of a telecommunications provider such as an inter-exchange carrier, or a separate location from the telecommunications provider, that houses servers, routers, ATM switches and digital/analog call aggregators. Internet Service Providers (ISPs), CLECs (Competitive Local Exchange Carrier) and ILECs (Incumbent Local Exchange Carrier) in turn rent or lease network infrastructure from the POP provider.

In addition to accommodating growth, POP providers require flexibility in configuring their network infrastructure. This flexibility is required, because ISPs and other network infrastructure consumers are constantly changing their network configuration in response to user demands.

As a result, there is a need in the art for the present invention.

SUMMARY

The above-mentioned shortcomings, disadvantages and problems are addressed by the present invention, which will be understood by reading and studying the following specification.

One aspect of the systems and methods includes providing a router that may be deployed as multiple logical routers (LRs) that share a common fast interconnect. These LRs may functionally serve as core routers, peering routers, aggregation routers, etc. A further aspect of the system and methods is that the resources assigned to a LR are allocated from a pool potentially including numerous hardware cards having a variety of types. A still further aspect of the system and methods is that a LR may be managed independently of the router owner. For example, a LR administrator associated with a party that rents or leases capability from the router owner may administer their own LR, thereby providing the LR administrator with more control over their own LR configuration, and relieving the router owner of the need to be involved with every configuration change that occurs on the router.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1A:
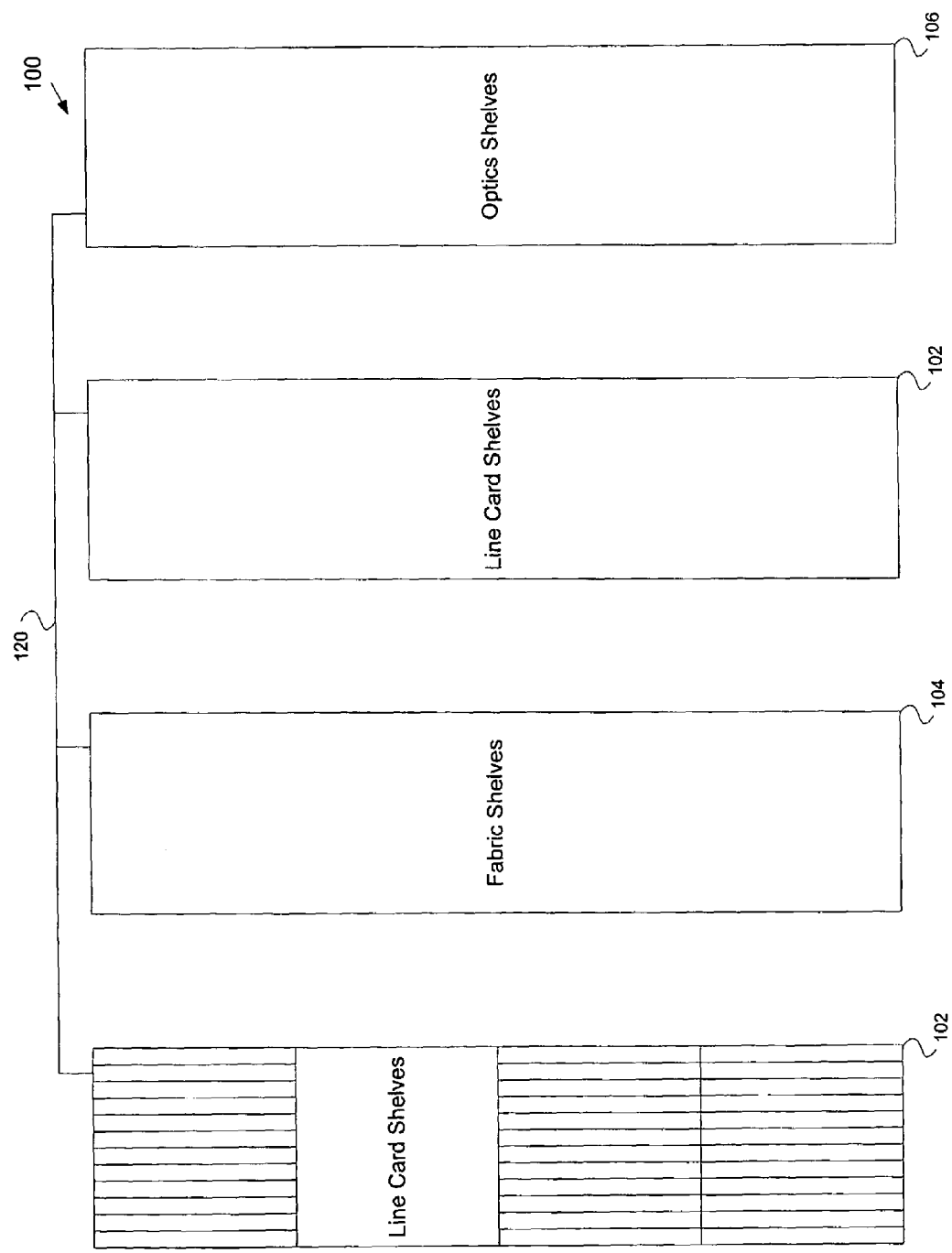
FIG. 1A is a block diagram of a router hardware and operating environment in which different embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

DEFINITIONS

The following terms and acronyms may be used in the specification:
DRP—Distributed Route Processor
EMS—Element Management System
FCAPS—Fault, Configuration, Accounting, Performance, Security
FIB—Forwarding Information Base
LC—Line Card
MS—Management System
OIR—Online Insertion and Removal
OSS—Operations Support System
Root-LR—The entity who is the owner of the LR.
Root-System—The entity who is the owner and administrator of the router chassis. The root-system user functions with "root" privileges over all router components and has the ability to monitor all LRs through the Admin Plane.
SC—Shelf Controller (controls all cards in a rack/bay)
RP—Route Processor (manages all cards in a rack and runs routing software for its LR)
Primary-Admin—A RP designated for managing the entire physical router. This is where the configuration used to manage and partition the physical router is stored. There may be some system software that only runs here.
Primary-LR—The RP where the authoritative configuration to manage the LR is stored. There may be some LR management software that only runs on this node.
root-LR—An external entity that has configuration and management control over a LR. Root-LR has control over one LR and can assign users and privileges within that LR.
LR—Logical Router
Owner-LR—In some embodiments, this is the LR associated with root-system. It may be the default LR and may be the access point to manage the Admin Plane.
LR User—An external entity that has restricted (restrictions defined by the root-system or by the root-LR) access to a LR.
Admin Plane—A plane of communication distinct from the intra-LR communication to allow coordination between LRs.
LR Plane—A plane of communication that comprises all nodes within a LR and is distinct from the Admin Plane and all other LR planes. In some embodiments the LR plane of one LR does not overlap physically with that of other LRs.

OPERATING ENVIRONMENT

FIG. 1A is a block diagram of a physical router hardware and operating environment 100 in which different embodiments of the invention can be practiced. In some embodiments of the invention, router 100 includes one or more line card shelves 102, one or more fabric shelves 104 and one or more optics shelves 106. A group of one or more shelves may be referred to as a "rack" or "bay". In some embodiments, each shelf includes a number of slots capable of accepting and interconnecting differing types of router elements. The shelves are interconnected using fiber optic cables. In some embodiments, fabric shelf 104 is divided into two backplanes, comprising two sets of autonomous control planes that share power and cooling resources within the rack they occupy. In some embodiments, a fabric rack may include up to 48 cards to manage S2 fabric elements.

Optics shelf 106 is optional, and when part of a router 100 may contain WDM (Wave Division Multiplexing) equipment, optical switches used for wavelength switching, and other optical components such as amplifiers and long reach optics.

Figure 1B:
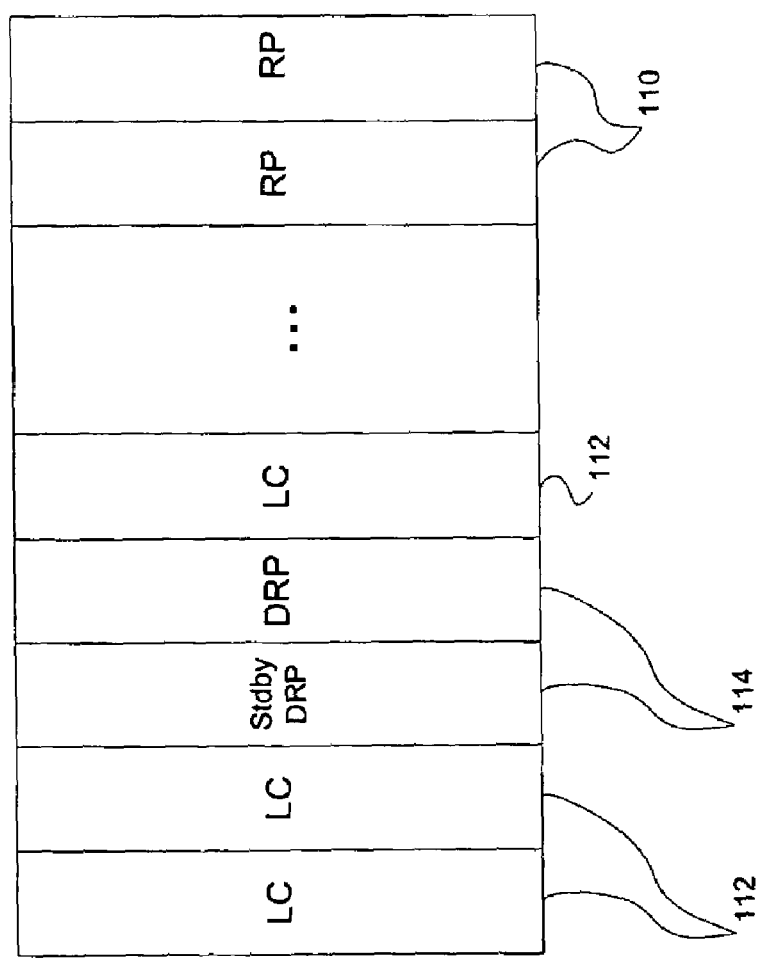
FIG. 1B is a diagram providing further details of the router hardware and operating environment according to an embodiment of the invention.

FIG. 1B is a diagram providing further details of the router hardware and operating environment according to an embodiment of the invention, including the differing types of router elements that may be placed in line card shelves 102. In some embodiments, router elements that may be placed in the slots of line card shelves 102 include shelves controllers (SC), Route Processors (RP) 110, line cards (LC) 112 and distributed route processors (DRP) 114. SCs or RPs 110 may be used to manage the hardware components of a given rack (bay) if necessary, although primary control of the entire system, including the rack may be through the Primary-Admin (described below) in some embodiments. In some embodiments there may be two SCs or RPs 110 per rack for redundancy purposes, with the second SC or RP 110 operating in a stand-by mode. The DRP 114 and LC 112 router elements within router environment 100 may be allocated as described in detail below to Logical Routers configured within router environment 100. In some embodiments, SCs may not be allocated to a LR; rather they are a resource managed by an Admin Plane. Thus SCs are not accessible to the LR operators and are accessible only by the root-system operators. It should be noted that the router elements assigned to a LR may be located in multiple line card racks 102, they need not be colocated in a single rack. This is further illustrated in FIG. 1D described below.

In some embodiments, SCs and/or RPs 110 provide the following functions in the line card rack 102:
  Bringup and image download to cards in the rack
  Inventory management without respect to LR assignment. They will take the Primary-Admin role according to configuration and election mechanisms.
  When operating as Primary-Admin, a RP will perform inventory partitioning among LRs. In some embodiments, once initial partitioning is done and a Primary-Admin is selected, the subsequent inventory management can be done through the Admin Plane (with partitioning data still residing on the RPs or SCs and being modified through the Admin Plane). In other embodiments, the partitioning of the system is predicated on the election of a Primary-Admin, where the partitioning configuration is stored.
  Synchronization of inventory data between multiple SCs/RPs
  OIR detection
  Diagnostics of all cards/components in a rack
  Card redundancy/fail-over control
  Environment monitoring and cooling control
  Configuration and monitoring of connections to the cross-connect fabric
  Control of the internal Gigabit Ethernet and Fast Ethernet or other buses In some embodiments SCs/RPs 110 have persistent storage such as a flash memory card or hard disk, and may be used to store the inventory of partitioning of h/w (cards) into LRs and diagnostic logs for the local rack and cards within it.

The SCs in fabric racks 104 and optics racks 106 have similar basic functionality and fabric/optics specific functions as described above with respect to RPs 110.

Line cards 112 switch data that is traversing the router and have per interface fault monitoring, configuration, accounting and performance monitoring components. Line cards 112 also collect statistics regarding the flow of network data passing through the line card 112. In some embodiments, line cards 112 include a general purpose CPU and specialized switching hardware for packet switching at line rates. In addition, line card 112 may include flash memory to contain a boot image for the line card processor.

DRP 114 comprises a general purpose processor available to run routing, management and router infrastructure software. In some embodiments, a single DRP board insertable in a slot in a line card shelf contains two processing elements. In these embodiments, there are two sets of physical hardware, one for each processing element on the board. In some embodiments, the two processing elements on a board share a fabric connection. Boot image software and configuration data is maintained on persistent storage on the DRP. In some embodiments, the persistent storage is flash memory, however any persistent storage mechanism known in the art may be used. Other software and data may be maintained on a disk such as a PCMCIA disk on DRP 114. DRPs may be used to load share instances of routing processes (OSPF, IS-IS, BGP etc).

Processes running on RPs and DRPs manage the functioning of a LR. For example, a RIB (Routing Information Base, based on the information obtained from DRPs) is built, converted to FIB (Forwarding Information Base) which is then downloaded to line cards using the switch fabric. Processes on these cards also perform other network layer 3 functions like restoration, MPLS and traffic engineering support, routing protocol and connection management and static routing configuration, ACL support etc.

A LR is managed through software running on its RPs and/or DRPs. For example, a LR user/root-lr (either human or machine) can connect to the LR using CORBA (Common Object Request Broker Architecture), CLI (Command Line Interpreter), SNMP (Simple Network Management Protocol) or HTTP (Hyper-Text Transfer Protocol).

The Primary-LR contains configuration and provisioning information for a LR and aggregates performance, accounting, and fault management functions for a LR. High bandwidth data is configured through commands hosted on the Primary-LR, but the data can be sent directly to an external collector using a path set up through switching fabric and a linecard. Persistent storage on a Primary-LR element such as a PCMCIA disk may be used to store configuration, performance, accounting and fault management data. In some embodiments, a Primary-LR performs one or more of the following functions:

Main programmatic and non-programmatic access point to a LR (CORBA/CLI/SNMP/Http Support)

LR loopback address/management proxy servers location (for management connectivity which is routed to the router over the LC interfaces)

LR—wide configuration creation and modification (including configuration of interfaces, routing protocols, LR user profiles etc)

LR monitoring access point (performance, accounting, and fault management at interface granularity level).

Maintain operational data—LC status, routing tables, etc.

Maintain performance statistics

Maintain accounting data

Fault management information—LC failure control, etc.

System diagnostics access and diagnostics related information

Debugging/diagnostics information

Warm restart images

Thus in some embodiments, the Primary-LR is at the logical center of the LR and acts as the entity with routing and proxy intelligence. Routing and configuration of the LR is distributed across DRPs 114, the DRPs 114 are in turn managed via the Primary-LR. If the router system 100 is composed of many LRs, each LR is managed by a separate Primary-LR. It is possible that some aspects of the Primary-LRs functionality may be distributed across more than one DRP 114 or RP 110 card for scalability reasons. It is also possible that the entire router system 100 can function as a single LR.

One RP 110 may be designated or elected as a Primary-Admin. The Primary-Admin manages the Admin Plane 140 (FIG. 1D), which is how root-system manages the router. In some embodiments, the Primary-Admin is used to manage all hardware components of the router, either directly or indirectly through RPs 110 and/or SCs. If the root-system also operates a LR, the RP 110 that is elected Primary-Admin may also have the Primary-LR role for the Owner-LR. Persistent storage on the Primary-Admin may be used for storing configuration information, alarm and performance data used by common hardware in the router environment 100, diagnostic logs for all router components, and LR administrative statistics, audit and accounting logs.

In some embodiments, the Primary-Admin provides one or more of the following functions in the router (though in some embodiments some of these functions may be distributed amongst other nodes in the Admin Plane):

Inventory management and LR resource allocation/administration

Bring up management and image management of all cards, including OIR handling (through RP or SC)

Diagnostics of all cards/components.

Overall router health monitoring

Management of resources shared among LRs (e.g. Fabric, environmental monitors)

Some MIBs (Management Information Base), statistics, logging, alarm and audit capabilities useful for an router owner. Includes SNMP agent to export inventory, fault, performance data Card redundancy/fail over control (through RP or SC)

Figure 1C:
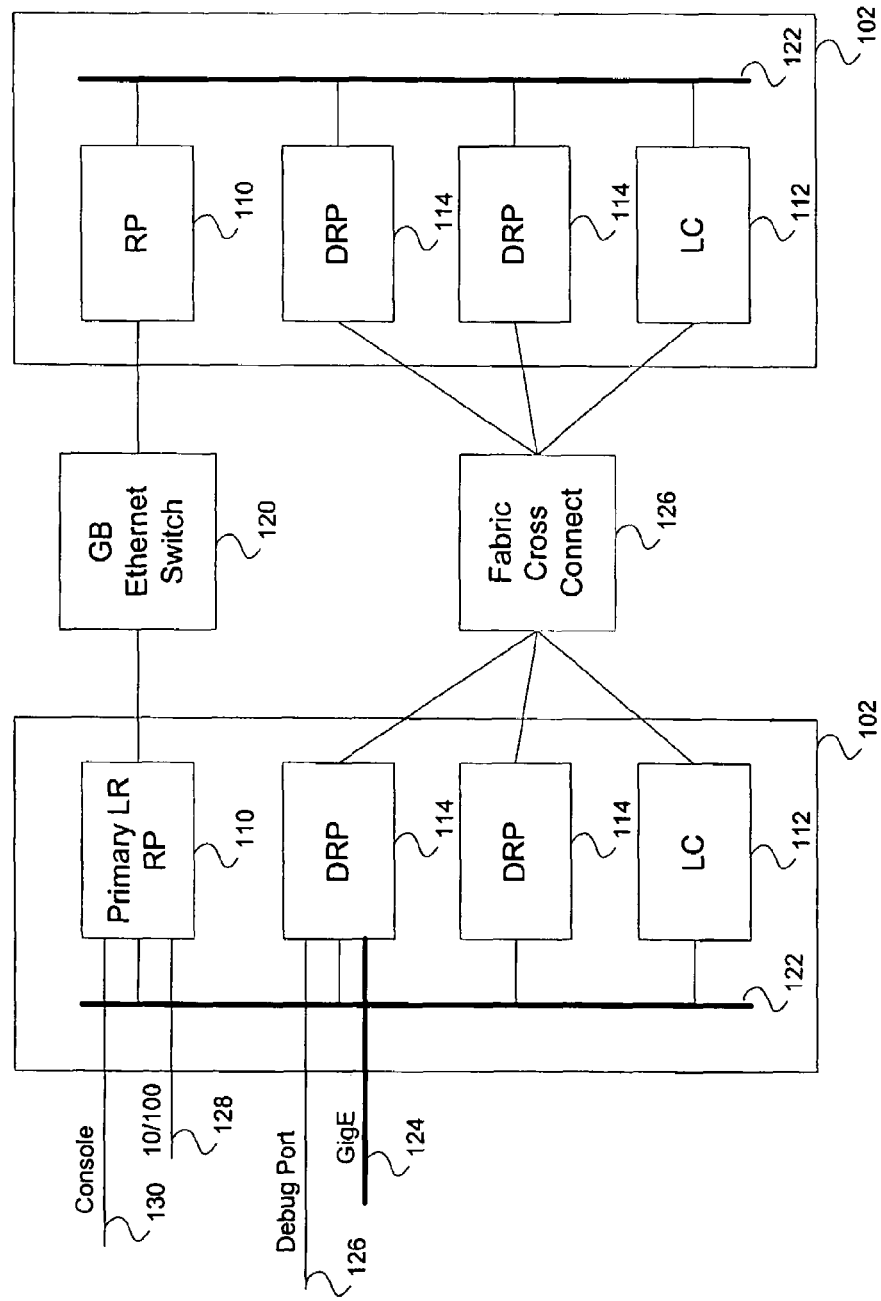
FIG. 1C is a diagram providing further details of the data communications external and internal to the hardware and operating environment according to an embodiment of the invention.

FIG. 1C is a diagram providing further details of the data communications external and internal to the hardware and operating environment according to an embodiment of the invention. In some embodiments, RPs 110 and SCs on differing racks are interconnected through a Gigabit Ethernet switch 120. LR components within a rack such as RP 110, DRPs 114 and LCs 112 may be interconnected using a fast Ethernet 122 in some embodiments. Additionally, LR components including RPs and DRPs and LCs in LC racks 102 both within a rack and on differing racks are interconnected via fabric cross connect 126. In some embodiments it is noted that the data flow (data that travels in the data plane) between distinct LRs is not internally switched through the fabric cross connect 126. Rather, this data is routed external to the router and then is routed back in.

System management messages may be constrained to using a certain paths. For example, flow accounting data may be constrained to use a fabric 126 path to an external collector. The path may be predetermined through a hardcoded entry or through a configuration entry. This path constraint is desirable in order to ensure predictable delivery and ordering.

During router bringup and LR configuration, a combination of the internal Gigabit Ethernet 120 and Fast Ethernet 122 may be used. In some embodiments, the switching fabric 126 is unavailable at bringup time. Additionally, Primary-Admin and SC 110 may need to interact in order to exchange configuration tables and other related data. This interaction typically takes place over the internal Fast Ethernet 122.

Statistics, debugs and logs from the LCs 112 may be uploaded to an RP 110 or DRP 114 through the Fabric 126.

In addition to the inherent external communications provided by LCs 112, DRPs 114, RPs 110 and SCs are also capable of communicating with entities external to a router 100. RPs, DRPs and SCs in some embodiments may include a 10/100 Ethernet connection 128 and a console port 130 to communicate with external entities.

In some embodiments, RPs 110 and DRPs 114 include a Gigabit Ethernet connection 124 and an on-board debug port 126. Gigabit Ethernet connection 124 may be used to allow root-LRs to configure a LR and to perform FCAPs functions regarding the LR. If RP 110 is functioning as an Primary-Admin, the router owner may use the Gigabit Ethernet connection 124 for super configuration of the router and for performing FCAPs and diagnostics functions for the entire router. On-board debug port 126 may be used to provide initial hardware and software debugging capabilities.

Figure 1D:
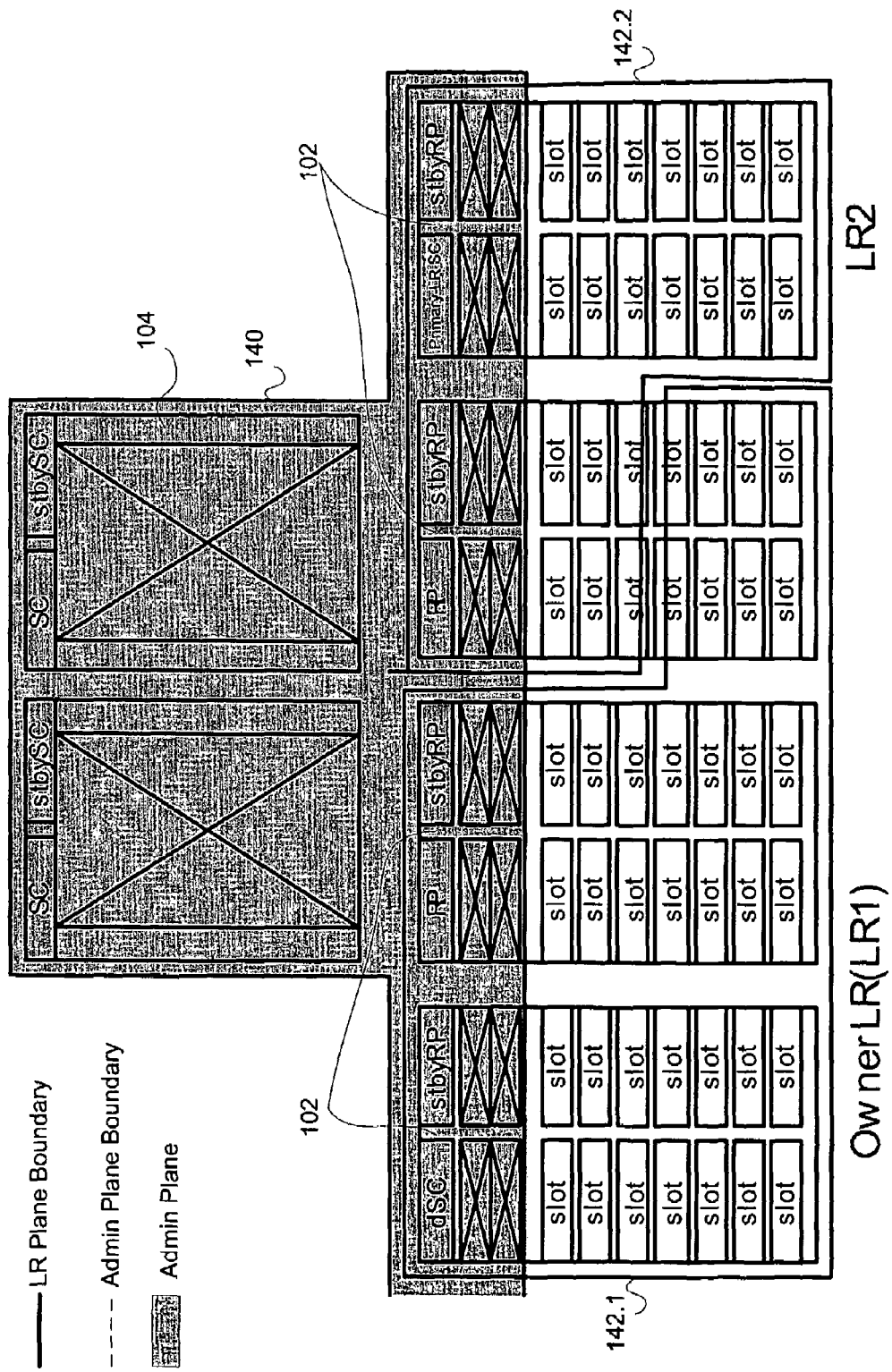
FIG. 1D is a diagram illustrating administrative and logical router boundaries according to various embodiments of the invention.

FIG. 1D is a diagram illustrating exemplary plane boundaries within a router 100 that has been configured with two LRs 142.1 and 142.2 on four line card racks 102. As shown in FIG. 1D, an LR may include elements from more than one line card rack 102. In the exemplary configuration, LR 142.1 includes router elements in LCs 102.1, 102.2 and 102.3, while LR 142.2 has been configured with router elements n LCs 102.3 and 102.4.

In addition, the Admin plane 140 (shaded area) for the router is shown as including elements (RPs, and SCs) from each of the line card racks 102 in the router. The elements in the admin plane participate in the configuration and management of the router and the LRs configured within the router.

Figure 2:
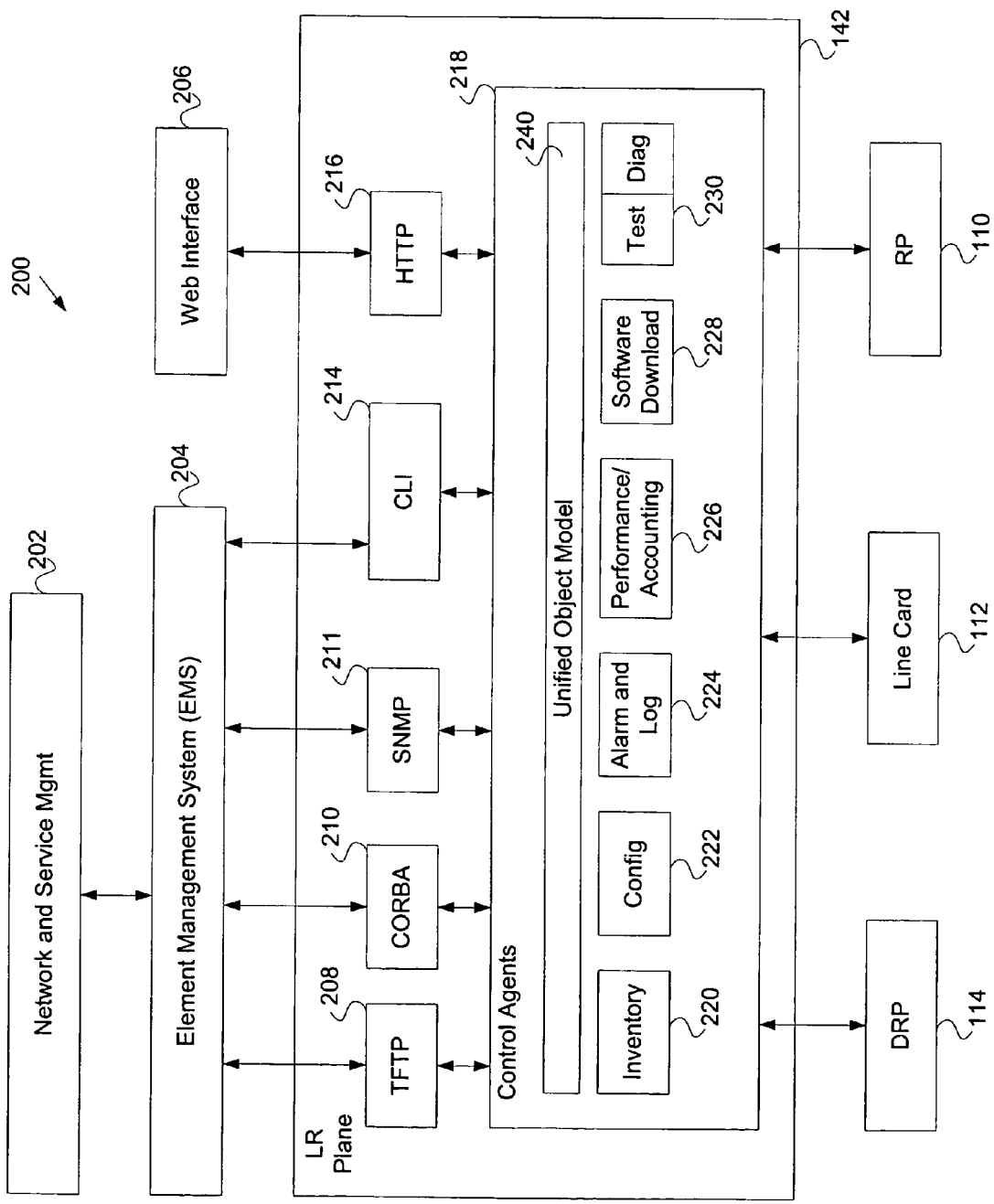
FIG. 2 is a diagram of a router software environment according to an embodiment of the invention.

FIG. 2 is a diagram of a router software environment 200 according to an embodiment of the invention. In some embodiments, router software environment 200 includes a Network and Service Management (NSM) component 202, an Element Management System 204, a web interface 206 and software components executed within an LR 142.

An Element Management System 204 in some embodiments may be provided through a separate workstation/server. The workstation may be a UNIX based workstation (e.g. SUN Solaris). In some embodiments, EMS 204 communicates with the physical router 100 using CORBA, however other communications methods may be used. The EMS typically has disk storage with a relational database management system (e.g. Oracle), which may be used to store configuration, performance, alarm and accounting data.

In alternative embodiments, EMS 204 may be provided as a module running within a router system 100.

In some embodiments, EMS 204 provides web based GUI and FCAPS applications to aid in the provisioning, event correlation and performance monitoring of a LR. In some embodiments, an instance of EMS 204 is configured such that it may only manage one LR through communications with a RP 110 associated with the LR. Alternatively, EMS 204 may be configured to communicate with an Primary-Admin, in which case the EMS 204 has access to the entire physical router.

Network and Service Management (NSM) 202 is logically above the EMS system 204 and may include customer provided/developed applications, third-party applications, and network flow and provisioning tools. Because EMS 204 is optional, NSM 202 can also interact directly with the physical router 100. Typically NSM systems focus on service provisioning, service monitoring (including network performance and statistics), billing and fault handling/reporting.

In varying embodiments of the invention, software running within a LR includes various software components (referred to collectively as control agents 218) configured to communicate with software modules such as EMS 204 and/or NSM 202 in order to support configuration, FCAPS, software downloads, and test/diagnoses of router 100 and LRs within router 100. In various embodiments, software in the LR includes one or more of inventory component 220, configuration component 222, alarm component 224, performance/accounting component 226, download component 228 and/or test/diagnosis component 230. In some embodiments, these control agents 218 interface with an object model 240 that stores data regarding various aspects of router 100 or LRs configured within router 100.

Additionally, a variety of communications mechanisms may be used to communicate with control agents 218 in LR plane 142. Examples of such mechanisms include TFTP 208, CORBA 210, SNMP 211, CLI (command line interface) 214 and HTTP 216. In some embodiments, security mechanisms may be provided for the communications mechanisms through username-password protection, multiple user privilege levels, access lists, secure shell (SSH), SNMP V3, CORBA, and HTTP security mechanisms (e.g. Secure Socket Layer—SSL).

Object model 240 may include an Object Request Broker (ORB). In some embodiments, the ORB may be based on OMG CORBA 2.3 or later specification. Due to the embedded nature, an ORB incorporated by modules such as RP 110 or other element within an LR plane 142 may fall somewhere between the full and the minimum specification defined by OMG. Examples of ORBs that may be used within varying embodiments of the invention include e*ORB, ORBexpress, TAO and VisiBroker.

Figure 3A:
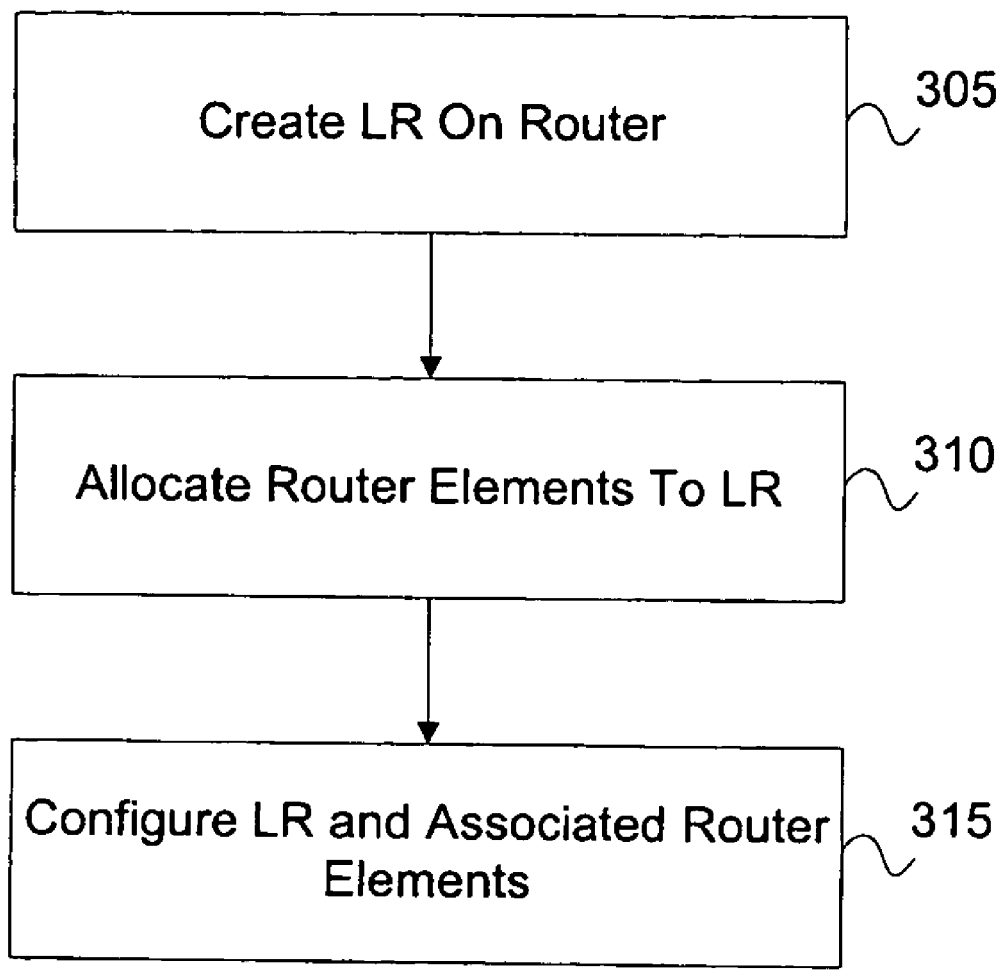
FIGS. 3A-3B are flowcharts illustrating methods for creating and maintaining a virtual private router according to embodiments of the invention.
Figure 3B:
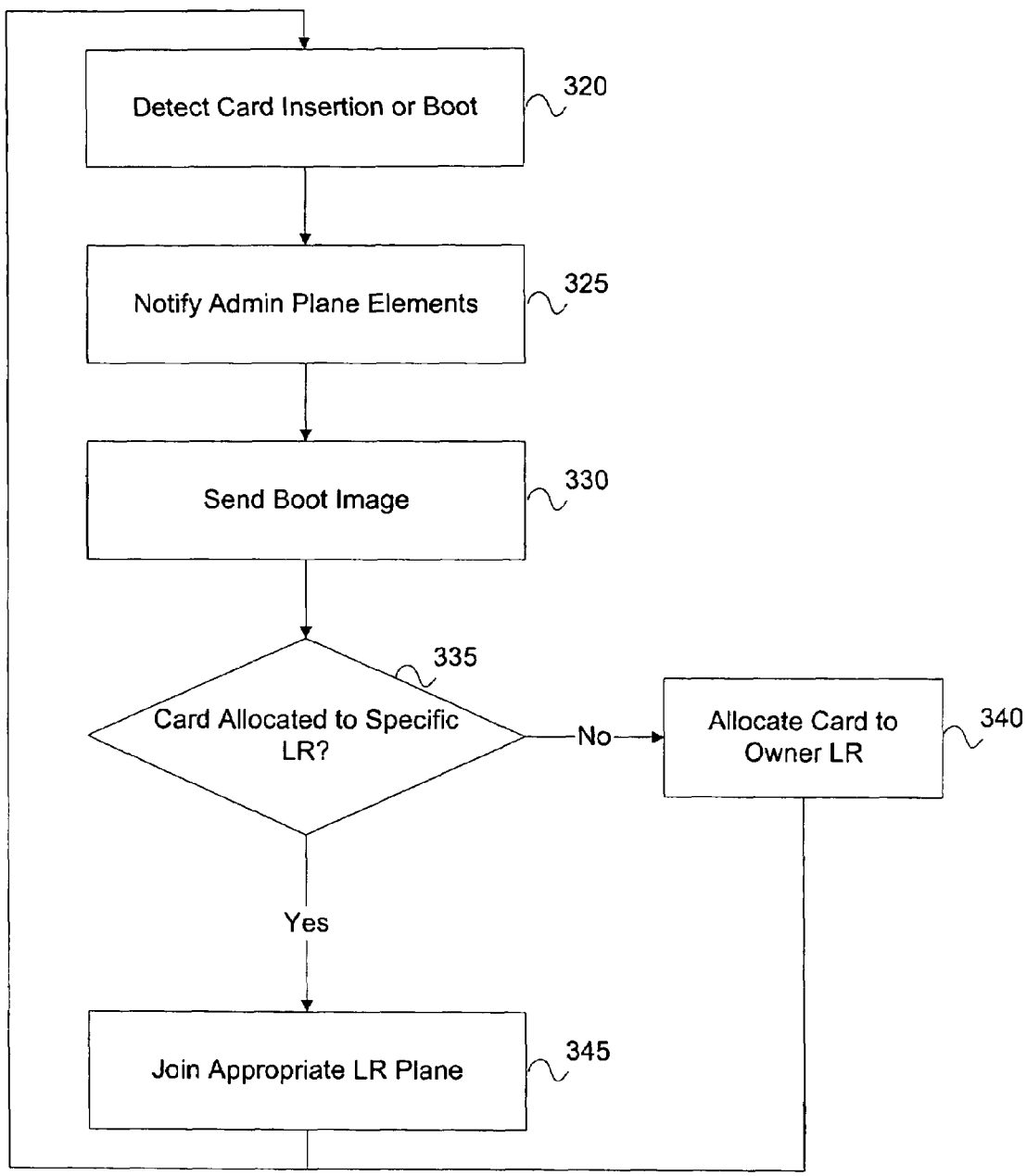

FIGS. 3A-3B are flowcharts illustrating methods for creating and maintaining a logical router according to embodiments of the invention. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 3A-3B are inclusive of acts that may be taken by an operating environment executing an exemplary embodiment of the invention.

FIG. 3A illustrates a method for creating a LR according to an embodiment of the invention. The method begins by creating at least one LR on the physical router (block 305). The configuration of a router may be referred to as "super configuration", while configuring each individual LR may be referred to as LR configuration. In some embodiments, an LR is created by the Primary-Admin. Primary-Admin gets the inventory information on which cards are available in the system from the SCs and/or RPs. In some embodiments, all cards that are not assigned to another LR are assigned to the Owner-LR. The super configuration may be stored on any form of persistent storage, and in some embodiments is stored on a disk accessible within the Admin-Plane. In some embodiments, the Primary-Admin is the only entity through which the owner can perform a super configuration. Based on this configuration, the Logical Router Daemon (LRd) running on the Primary-Admin node creates LR partitioning tables and distributes appropriate necessary information to the LRd in other LRs. The LRd in the Owner-LR administers the partitioning of the system into multiple LRs, and the LRd in each LR (including the Owner-LR) manages the inventory for that LR.

Next, router elements are allocated to the newly created LR (block 310). In some embodiments, router elements may be allocated by identifying the card slots (specified by a rack number and a local slot number) that belong to which LR. The card slots refer to only the slots that can accommodate LC, DRP or RP cards. This super configuration may create a runtime slot-to-LR Inventory Table (see Table 1) maintained by system inventory software in the Admin Plane. Note that the card slots also can be unassigned from any LR and reassigned to other LRs. In fact, the entire LR may be dismantled (with the exception of Owner-LR in embodiments with such an LR). Also, some card slots may not be assigned to any LR in some embodiments. In some embodiments, Admin Plane configuration will reflect which card slots are unassigned in a free pool, for later assignment.

In some embodiments, a LR is created so as to have at least one RP card. Additionally, LC, DRP and further RP cards may be assigned to the LR. In some embodiments, it is assumed that an LC, DRP, or RP may only belong to one LR and cannot belong to more than one LR at the same time. Typically a LR will have one or more RP, DRPs and LCs. SCs, fabric and optical cards are shared resources owned by physical router/Admin Plane and do not belong to any particular LR.

Super configuration may also specify the configuration of LR to Fiber/wavelength assignment within optical racks.

In some embodiments, only entities with root-system privileges are allowed to perform super configuration. Super configuration may also specify what image each card/LR will use. This information is distributed to SCs and RPs in the Admin Plane. In some embodiments root-LR will be able to specify the image or parts of the image that will run within their LR.

Note that during the system's normal operation, card slots may be added and/or removed by adding or deleting racks because of upgrades or failure. Also, depending on the end user deployment, LRs may be created and deleted dynamically by root-system configuration. As a result, it is desirable that the partitioning scheme be dynamic since boot-time static partitioning may be too limiting.

Those of skill in the art will appreciate that other mechanisms could be used to identify LR membership instead of or in addition to card slots. For example, an identifier uniquely identifying a router element may also be used to specify the LR association.

In some embodiments, LR creation is not complete until the root-system does some minimal configuration in the Primary-LR card of the particular LR for permitting a root-LR to do the full LR configuration later. If there is no RP or DRP card in a LR or the initial configuration is not complete, that LR will remain non-operational.

In some embodiments, a Slot-LR inventory database is used within the router to specify the association between a card slot and a LR. The LRd that handles the Admin Plane configuration may create this database when LRs are created. Whenever LRs are created/deleted/reallocated, or when card slots are added/deleted to any of the existing LRs, the LRd may update this database. This configuration is stored in persistent storage and hence this database can be recreated across reboots of the router. In some embodiments, a table is used to specify slot to LR assignments. In alternative embodiments, a list, array or other data structure may be used to specify slot to LR assignments. Table 1 below provides an example of a Slot-LR table used in one embodiment of the invention.

TABLE 1

|  | LR1 | LR2 | LR3 | ... |
|---|---|---|---|---|
| R1S1 | 1 | 0 | 0 | |
| R1S2 | 0 | 1 | 0 | |
| ... | | | | |
| R1S24 | 0 | 0 | 0 | |
| R2S1 | 1 | 0 | 0 | |
| R2S2 | 0 | 0 | 1 | |
| ... | | | | |

In the example shown, the cards located in rack 1, slot 1 and rack 2 slot 1 have been allocated to LR 1, the card located in rack 1 slot 2 have been allocated to LR 2, and, the card in rack 2 slot 2 has been allocated to LR 3.

In alternative embodiments, LR identifiers such as LR names may be associated with each rack and slot in the system in a configuration database maintained by Admin Plane.

After root-system configures the router (through Owner-LR/Admin Plane) with appropriate software images, runs diagnostics to ensure that the system performs correctly and optionally partitions the router into multiple LRs, each LR is then ready for configuration by a corresponding root-lr.

Next, the LR itself is configured (block 315). In some embodiments, intra-LR partitioning concerns assigning/unassigning LCs and DRPs to appropriate DRPs. This is typically done by the root-LR, an entity which is allowed (by root-system) to configure a LR. Many root-LRs can be configured on a LR. The root-LR table is set up by the Owner when the router is commissioned or when a LR is created. Intra-LR partitioning is dynamic i.e. card slots may be added/removed to/from the LR and also the cards within the assigned slots are OIR-able.

In some embodiments, the LR configuration includes configuring which DRPs or RPs will manage a set of LCs or run certain processes within the logical boundary of the LR. This configuration may be done through a LR configuration.

Note that during slot assignment to LRs, there may or may not be line cards in the slots. Generally only the RPs or SCs in the rack know whether there are cards in the slots or not and this information is then distributed to the LRd and other processes. Also, typically only the RPs in the local rack can detect OIR of cards. In some embodiments, the Admin Plane contains this information from SCs and provides means for notifying LRd in each LR. When a LR is configured, the LRd may query the LRd in the Owner-LR or the Admin-Plane inventory information for the list of slots that are owned by its LR and which slots have what cards currently and further register for OIR events with Admin Plane inventory management software for any future OIR events within those slots. Also, in some embodiments, when card slots themselves are added/removed from the LR by root-system through the Admin Plane configuration, Admin Plane configuration software will provide for notification to the appropriate LRd, which then will take appropriate action. Also, the root-system may request complete shutdown of a LR when the entire LR is being dismantled.

Some embodiments of the invention maintain a Slot-RP assignment table. Generally there is one Slot-RP table per rack, and the table may be maintained by Admin Plane. In some embodiments, this table is typically used as an optimization step during a discovery process. DRPs and LCs query the Admin Plane for their assignment information, and that this information is used to find the LRd for their LR.

In some embodiments, root-LR may have limited access to the root-system configuration, and that configuration would be used by the RP when its associated LR boots. The RP may have access to the system part of the Primary-Admin configuration.

FIG. 3B illustrates a method for handling the insertion of a router element according to an embodiment of the invention. The method begins by detecting the insertion of a router element card into a slot in the router (block 320). In some embodiments, the insertion of the router element card into the slot cause the card to power up and bootstrap with code stored in on-board memory such as an on-board flash memory. In some embodiments, a signal is sent to the SC or RP for the rack to notify the card of the insertion.

Next, in some embodiments, the Admin Plane for the router is notified of the insertion by the SC or RP (block 325). Admin Plane will pass this event to the LRd that owns that slot (if there is any) of the card by looking up the Slot-RP assignment in a configuration database. Alternatively the notification may be multicast in some embodiments to all LRds, but only the owning LRd takes action. Also, in some embodiments, corresponding SNMP traps may be generated on both Admin and LR to facilitate card auto-discovery on external management stations.

Additionally, a boot image may be sent to the card (block 330). In some embodiments, the bootstrap process on the card initializes a fast Ethernet interface and the initial bootstrap program starts an image loader that establishes communication with SC or RP for system image downloading.

Images for the router element cards may be kept in a persistent storage device associated with the SC or RP in the same rack. In some embodiments, the image loader (launched by the bootstrap process) multicasts request for a system image by specifying inventory information in the message (e.g. card type, slot number, etc.). The SC or RP selects the image and transfers it to the router element card via the FE link.

Next, a check is made to determine if the router element card is allocated to a LR (block 335). In some embodiments all potential LR elements default to the LR associated with the Owner-LR, so the above check is always affirmative for these elements. Each SC may keep a copy of a subset of the LR assignment table (Table-1) that contains only slots in the same rack. After a router element card is up and running, it queries the SC or RP for information about joining the appropriate LR plane (block 345). The SC or RP sends a response by looking up the Slot Assignment Table or by querying the LRd in the Owner-LR. Otherwise, in some embodiments the id of the Owner-LR will be given to the router element card. The router element card becomes a member of the Owner-LR (block 340). Alternatively, the card may be assigned to a free pool.

CONCLUSION

Systems and methods for providing a logical router within a physical router have been disclosed. The systems and methods described provide advantages over previous systems. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method for providing a logical router within a physical router, the method comprising:
   creating at least one logical router (LR) on the physical router;
   allocating a plurality of router elements within the physical router to the at least one LR;
   assigning ownership of the at least one LR to an LR owner entity; and
   configuring the plurality of router elements within the LR;
   wherein creating the at least one LR, allocating the plurality of router elements and assigning ownership of the at least one LR require at least a first privilege level and wherein configuring the plurality of router elements requires at least a second privilege level, the second privilege level restricting access to the at least one LR to the LR owner entity or to a user having the first privilege level.

2. The method of claim 1, wherein allocating a plurality of router elements includes assigning a slot address to the at least one LR.

3. The method of claim 1, wherein allocating a plurality of router elements includes assigning a router element identifier to the at least one LR.

4. The method of claim 1, wherein configuring the plurality of router elements includes configuring a distributed route processor.

5. The method of claim 1, wherein configuring the plurality of router elements includes configuring a line card.

6. The method of claim 1, wherein configuring the plurality of router elements includes configuring a Route Processor.

7. The method of claim 1, wherein allocating a router element of the plurality of router elements includes allocating the router element to only one LR at a particular time.

8. A router comprising:
   means for creating at least one LR on the physical router;
   means for allocating a plurality of router elements within the physical router to at least one LR;
   means for assigning ownership of the at least one LR to an LR owner entity; and
   means for configuring the plurality of the router elements within the LR;
   wherein the means for creating the at least one LR, the means for allocating the plurality of router elements and the means for assigning ownership of the at least one LR require at least a first privilege level and wherein the means for configuring the plurality of router elements requires at least a second privilege level, the second privilege level restricting access to the at least one LR to the LR owner entity or to a user having the first privilege level.

9. The router claim 8, wherein the means for allocating a plurality of router elements includes means for assigning a slot address to the at least one LR.

10. The router of claim 8, wherein the means for allocating a plurality of router elements includes means for assigning a router element identifier to the at least one LR.

11. The router of claim 8, wherein the router element is a distributed route processor.

12. The router of claim 8, wherein the router element is a line card.

13. A computer-readable medium having computer-executable instructions for providing a logical router (LR) within a physical router, the method comprising:
- creating at least one LR on the physical router;
- allocating a plurality of router elements within the physical router to the at least one LR
- assigning ownership of the at least one LR to an LR owner entity; and
- configuring the plurality of router elements within the at least one LR;
- wherein creating the at least one LR, allocating the plurality of router elements and assigning ownership of the at least one LR require at least a first privilege level and wherein configuring the plurality of router elements requires at least a second privilege level, the second privilege level restricting access to the at least one LR to the LR owner entity or to a user having the first privilege level.

14. The computer-readable medium of claim 13, wherein allocating a plurality of router elements includes assigning a slot address to the at least one LR.

15. The computer-readable medium of claim 13, wherein allocating a plurality of router elements includes assigning a router element identifier to the at least one LR.

16. The computer-readable medium of claim 13, wherein configuring the plurality of router elements includes configuring a distributed route processor.

17. The computer-readable medium of claim 13, wherein configuring the plurality of router elements includes configuring a line card.

18. The computer-readable medium of claim 13, wherein allocating a router element of the plurality of router elements includes allocating the router element to only one LR at a particular time.

19. A computerized method for configuring a logical router (LR) within a physical router, the method comprising:
- selecting a LR on the physical router, the LR having an owner entity;
- allocating a plurality of router elements within the physical router to the selected LR;
- receiving configuration data for the plurality of the router elements within the at least one LR; and
- storing the configuration data in a configuration for the LR;
- wherein selecting the LR, and allocating the plurality of router elements require at least a first privilege level and wherein receiving configuration data for the plurality of router elements and storing the configuration data requires at least a second privilege level, the second privilege level restricting access to the at least one LR to the LR owner entity or to a user having the first privilege level.

20. The computerized method of claim 19, wherein selecting the LR comprises selecting a default LR.

21. The computerized method of claim 19, wherein allocating a plurality of router elements includes assigning a slot address to the at least one LR.

22. The computerized method of claim 19, wherein allocating a plurality of router elements includes assigning a router element identifier to the at least one LR.

23. The computerized method of claim 19, wherein configuring the plurality of router elements includes configuring a distributed route processor.

24. The computerized method of claim 19, wherein configuring the plurality of router elements includes configuring a line card.

25. A computer-readable medium having computer-executable instructions for providing a logical router (LR) within a physical router, the method comprising:
- selecting a LR on the physical router, the LR having an owner entity;
- allocating a plurality of router elements within the physical router to the selected LR;
- receiving configuration data for the plurality of the router elements within the at least one LR; and
- storing the configuration data in a configuration for the LR;
- wherein selecting the LR, and allocating the plurality of router elements require at least a first privilege level and wherein receiving configuration data for the plurality of router elements and storing the configuration data requires at least a second privilege level, the second privilege level restricting access to the at least one LR to the LR owner entity or to a user having the first privilege level.

26. The computer-readable medium of claim 25, wherein selecting the LR comprises selecting a default LR.

27. The computer-readable medium of claim 25, wherein allocating a plurality of router elements includes assigning a slot address to the at least one LR.

28. The computer-readable medium of claim 25, wherein allocating a plurality of router elements includes assigning a router element identifier to the at least one LR.

29. The computer-readable medium of claim 25, wherein receiving configuration data for a router element of the plurality of router elements includes receiving configuration data for a distributed route processor.

30. The computer-readable medium of claim 25, wherein receiving configuration data for a router element of the plurality of router elements includes receiving configuration data for a line card.

* * * * *

UNITED STATES PATENT AND TRADEMARK OFFICE
CERTIFICATE OF CORRECTION

| | | |
|---|---|---|
| PATENT NO. | : 7,415,507 B1 | Page 1 of 1 |
| APPLICATION NO. | : 10/772827 | |
| DATED | : August 19, 2008 | |
| INVENTOR(S) | : Ward et al. | |

It is certified that error appears in the above-identified patent and that said Letters Patent is hereby corrected as shown below:

In column 3, line 41, delete "root-LR" and insert -- Root-LR --, therefor.

In column 5, line 51, delete "linecard." and insert -- line card. --, therefor.

In column 7, line 32, delete "n" and insert -- in --, therefor.

In column 10, line 19, delete "and," and insert -- and --, therefor.

In column 10, line 28, delete "root-lr." and insert -- root-LR. --, therefor.

In column 12, line 58, in Claim 9, before "claim 8," insert -- of --.

Signed and Sealed this

Eleventh Day of November, 2008

JON W. DUDAS
*Director of the United States Patent and Trademark Office*